(12) United States Patent
Gerogeorge et al.

(10) Patent No.: US 12,394,964 B2
(45) Date of Patent: Aug. 19, 2025

(54) SELF-FITTING PRESSURE EQUALIZING WATERPROOF ELECTRONICS ENCLOSURE

(71) Applicant: Banner Engineering Corp., Minneapolis, MN (US)

(72) Inventors: John Gerogeorge, Minneapolis, MN (US); Nicholas Jarrett, Minneapolis, MN (US); Jonathan Bruno, Minneapolis, MN (US); Andrew Peter Messer, Minneapolis, MN (US); Ethan Stout, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 236 days.

(21) Appl. No.: 18/161,747

(22) Filed: Jan. 30, 2023

(65) Prior Publication Data

US 2024/0258778 A1    Aug. 1, 2024

(51) Int. Cl.
*H02G 3/08*    (2006.01)

(52) U.S. Cl.
CPC ............. *H02G 3/088* (2013.01); *H02G 3/081* (2013.01)

(58) Field of Classification Search
None
See application file for complete search history.

(56) References Cited

U.S. PATENT DOCUMENTS

| | | | |
|---|---|---|---|
| 4,163,503 A | * | 8/1979 | McKinnon ............... H02G 9/10 220/254.3 |
| 4,623,753 A | * | 11/1986 | Feldman ............... H01R 4/2483 174/50 |

(Continued)

FOREIGN PATENT DOCUMENTS

| | | |
|---|---|---|
| CN | 104624853 B | 5/2016 |
| CN | 209354534 U | 9/2019 |

(Continued)

OTHER PUBLICATIONS

Erdie Industries, Twist-n-Pull Mailing Shipping Tubes: No Tape or Staples Needed, accessed Sep. 1, 2022, https://erdie.com/pages/twist-n-pull-mailing-and-shipping-tubes.

(Continued)

*Primary Examiner* — Krystal Robinson
(74) *Attorney, Agent, or Firm* — Thompson Patent Law Offices PC

(57) ABSTRACT

Apparatus and associated methods relate to an electronic device enclosure having a water resistant property capable of withstanding a predetermined minimum displacement force. In an illustrative example, a pressed fit self-aligning device enclosure (PFSADE) may include a housing and a cover. The housing, for example, may include an opening configured to receive electronic components during an assembly processing. After the electronic components are installed, for example, the cover may be coupled to the housing to cover the opening. For example, the cover may include an edge surface around a perimeter of the cover and at least one self-aligning element (SAE) extending orthogonal to the edge surface. For example, the SAE may align the cover in a relative position to the housing, and to withstand a predetermined minimum displacement force threshold. Various embodiments may advantageously prevent leakage due to out of tolerance alignment between the housing and the cover.

20 Claims, 8 Drawing Sheets

(56) References Cited

U.S. PATENT DOCUMENTS

| | | | | |
|---|---|---|---|---|
| 4,872,847 | A | * | 10/1989 | Fennell .................. G01R 11/04 |
| | | | | 439/133 |
| 4,896,784 | A | * | 1/1990 | Heath ..................... H02G 3/14 |
| | | | | 174/53 |
| 5,310,075 | A | * | 5/1994 | Wyler .................... F21V 31/00 |
| | | | | 220/731 |
| 5,562,222 | A | * | 10/1996 | Jordan .................... H02G 3/14 |
| | | | | 220/800 |
| 5,677,578 | A | * | 10/1997 | Tang .................... H01R 13/701 |
| | | | | 307/119 |
| 5,688,298 | A | | 11/1997 | Bosses |
| 7,291,191 | B2 | | 11/2007 | Kaye |
| 7,296,730 | B2 | | 11/2007 | Erdie |
| 8,591,268 | B2 | | 11/2013 | Reimchen |
| 9,209,554 | B2 | | 12/2015 | Wießneth |
| 10,335,017 | B2 | | 7/2019 | Waagen et al. |
| 10,668,263 | B2 | | 6/2020 | Ingram et al. |
| 10,934,840 | B1 | | 3/2021 | Geyer et al. |
| 2004/0123997 | A1 | * | 7/2004 | Drane .................... H02G 3/088 |
| | | | | 174/67 |
| 2008/0083547 | A1 | * | 4/2008 | Pinol Pedret ........ H05K 5/0204 |
| | | | | 174/50 |
| 2013/0072063 | A1 | | 3/2013 | Qiao |
| 2015/0155696 | A1 | * | 6/2015 | Coenegracht ............ H02G 3/14 |
| | | | | 174/564 |
| 2017/0150656 | A1 | | 5/2017 | Brodsky et al. |
| 2021/0105917 | A1 | | 4/2021 | Vila et al. |
| 2021/0254683 | A1 | | 8/2021 | Baumann et al. |
| 2021/0318115 | A1 | | 10/2021 | Matsumoto et al. |
| 2021/0318437 | A1 | | 10/2021 | Kanoda et al. |
| 2022/0115852 | A1 | * | 4/2022 | Ustianowski ............ H02G 3/14 |

FOREIGN PATENT DOCUMENTS

| | | |
|---|---|---|
| DE | 202005021092 U1 | 5/2007 |
| DE | 202014103822 U1 | 9/2014 |
| DE | 102018215656 A1 | 3/2019 |
| EP | 2722937 A1 | 4/2014 |
| EP | 3784992 B1 | 8/2022 |
| ES | 2237363 | 8/2005 |
| WO | 2021009956 A1 | 1/2021 |

OTHER PUBLICATIONS

Keyence, M18 Threaded type Thrubeam M12 Connector Type, 30 m-PR-G51CBD | Keyence America, accessed Sep. 1, 2022, https://www.keyence.com/products/sensor/photoelectric/pr-g/models/pr-g51cbd/.

Sabert, Sabert 20005 14" x 9" x 16 1/4" 2 Entree Meal Cardboard Insert for Tamper-Evident Kraft Paper Delivery Bag—100/Case, accessed Sep. 1, 2022, https://www.webstaurantstore.com/lbp-20005-insert-for-self-sealing-delivery-entree-meal-for-2-bag-case/485TEIN20005.html.

Thor Labs, Self-Centering Lens Mounts, accessed Sep. 1, 2022, https://www.thorlabs.com/newgrouppage9.cfm?objectgroup_ID=1488.

International Search Report and Written Opinion of the International Searching Authority in related International Application No. PCT/US2023/061590, dated Sep. 22, 2023, 18 pages.

* cited by examiner

SELF-FITTING PRESSURE EQUALIZING WATERPROOF ELECTRONICS ENCLOSURE

TECHNICAL FIELD

Various embodiments relate generally to design and manufacture of sealed electronic devices.

BACKGROUND

A photoelectric sensor is a device used to determine the distance, absence, or presence of an object by using a light transmitter, often infrared, and a photoelectric receiver. In some examples, the photoelectric sensors may be used in industrial manufacturing. For example, the photoelectric sensors may be used to monitor a stack height of carton blanks in a magazine to ensure the stack is not empty to prevent downtime. For example, the photoelectric sensor may be used in a production line (e.g., a conveyor belt) to count a number of units traveling past a predetermined point for a predetermined time period. For example, the photoelectric sensor may be installed in a bottle processing line to reliably detect and accurately count these bottles as the bottles travel on the processing line may trigger predetermined downstream processes based on the bottle count.

Photoelectric sensors are also used in food industry applications. For example, the photoelectric sensor may be used to accurately measure a fill level in a bottle. For example, a food processing line may use photoelectric sensors to accurately detect clear food trays upon their approach. For example, the photoelectric sensor may provide an accurate detection of each tray to ensure that the filling machine only fills when a tray is present, preventing spillage and wasted product.

In various examples, such as in the food processing industry, the photoelectric sensors may be required to be water resistant and/or dirt resistant (e.g., with water resistant in ingress protection (IP) scale ratings). In some examples, the water resistant photoelectric sensors may be made with sealed IP69K-rated stainless steel which makes them washdown ready for use in the food industry. In some examples, because the photoelectric sensors may be required to be used in a sanitary environment (e.g., in a food processing line), the photoelectric sensor may withstand mechanical impact, over-tightening and extreme vibration. Some example housings may be made with IP69K-rated FDA-grade stainless steel enclosure to resist high-pressure, high-temperature washdown as well as chemical clean-in-place processes.

SUMMARY

Apparatus and associated methods relate to an electronic device enclosure having a water resistant property capable of withstanding a predetermined minimum displacement force. In an illustrative example, a pressed fit self-aligning device enclosure (PFSADE) may include a housing and a cover. The housing, for example, may include an opening configured to receive electronic components during an assembly processing. After the electronic components are installed, for example, the cover may be coupled to the housing to cover the opening. For example, the cover may include an edge surface around a perimeter of the cover and at least one self-aligning element (SAE) extending orthogonal to the edge surface. For example, the SAE may align the cover in a relative position to the housing, and to withstand a predetermined minimum displacement force threshold. Various embodiments may advantageously prevent leakage due to out of tolerance alignment between the housing and the cover.

Various embodiments may achieve one or more advantages. For example, some embodiments may advantageously include sealing members to fluidly seal the housing to the cover. Some embodiments may, for example, maintain an assembly force to couple the cover to the housing to be less than a predetermined maximum assembly force threshold. Some embodiments may, for example, include a relative position between the cover and the housing to be within a predetermined maximum displacement threshold. For example, some embodiments may advantageously provide a fluidly sealed electronic device enclosure in a connected mode.

Apparatus and associated methods relate to a cable connector of an electronic device enclosure having a water resistant property. In an illustrative example, a pressed fit self-aligning device enclosure (PFSADE) may include a housing. The housing may, for example, include a cavity coupled to a cable connector. For example, the cable connector may include electrical conduits to sealingly connect electronic components in the cavity to a distant device. For example, the cable connector may include an electric potting filling to fluidly seal the electrical conduits from an exterior environment. For example, a pressure balancing channel (PBC) may provide fluid communication between the cavity to the exterior environment. In a disconnected mode, fluid pressure within the internal cavity may be released through the PBC, for example. Various embodiments may advantageously prevent a pressure differential to be generated within the internal cavity in the disconnected mode.

Various embodiments may achieve one or more advantages. For example, some embodiments may, for example, advantageously prevent electric potting filling from obstructing the fluid communication of the PBC. Some embodiments may, for example, advantageously increase airflow with the PBC having non-circular cross-section.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, an exemplary pressed fit self-aligning device enclosure (PFSADE) is introduced with reference to FIGS. 1-2D. Second, this disclosure turns to a review of experimental data and a discussion of configuration and placement of the PFSADE based on a capability analysis with reference to FIGS. 3A-3B. Third, with reference to FIG. 4, a pressure balancing cable connector is described in application to the PFSADE. Fourth, and with reference to FIGS. 5-6, this document describes exemplary apparatus and methods useful for manufacturing and configuring the PFSADE. Finally, the document discusses further embodiments, exemplary applications and aspects relating to PFSADE.

Figure 1:
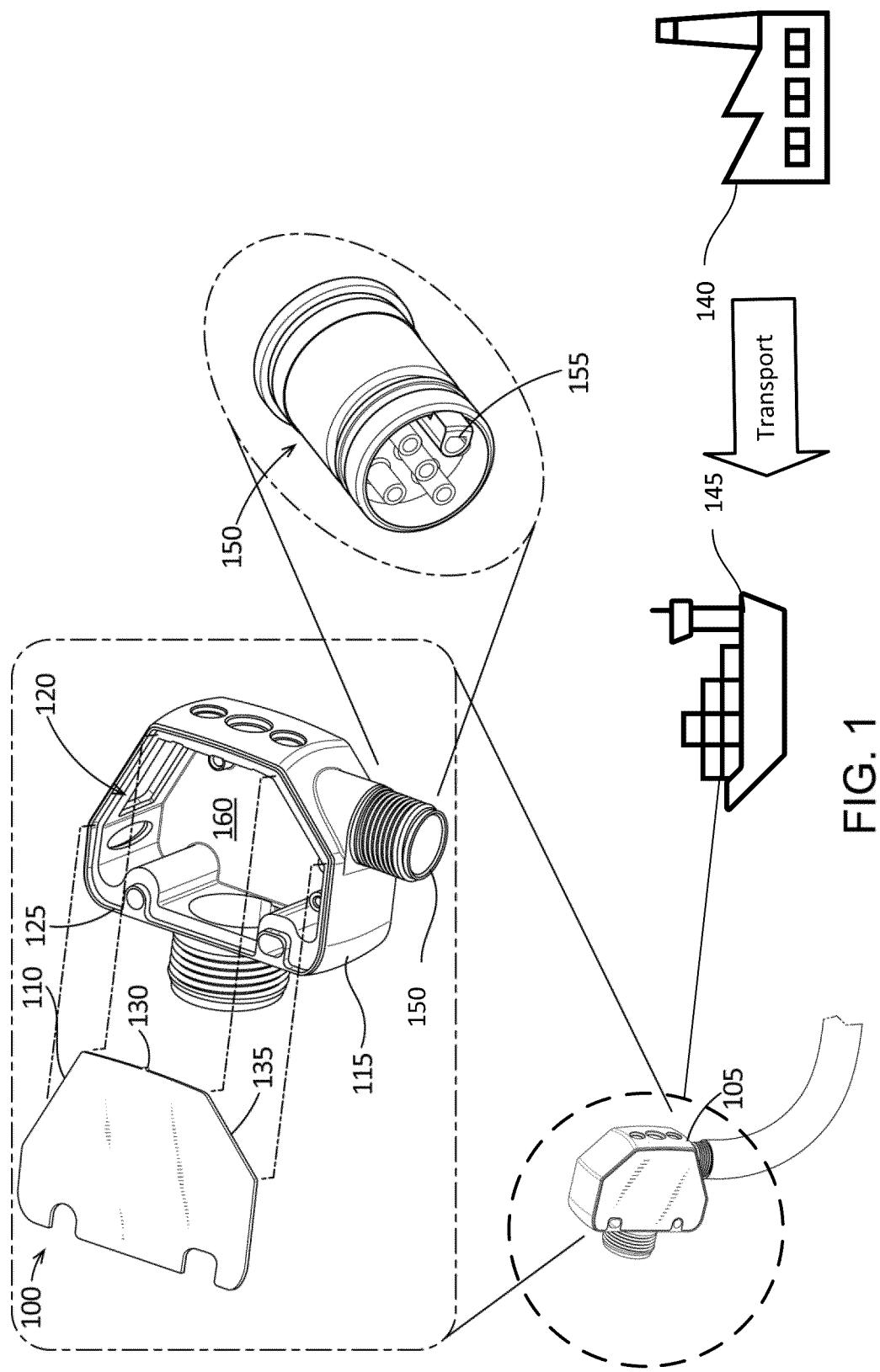
FIG. 1 depicts an exemplary pressed fit self-aligning device enclosure (PFSADE) employed in an illustrative use-case scenario.

FIG. 1 depicts an exemplary pressed fit self-aligning device enclosure (PFSADE 100) employed in an illustrative use-case scenario. For example, the PFSADE 100 may be used as an enclosure of a water resistant (and/or dust resistant) electronic device. For example, the water resistant electronic device may be an electronic device 105 (as shown in FIG. 1). For example, the electronic device 105 may be a water resistant photoelectric distance sensor. For example, the electronic device 105 may be used in a food processing industry that requires a housing of a specific water resistant rating. For example, the PFSADE 100 may be self-aligned in an assembly process that may advantageously reduce faulty devices failing to reach the specific water resistant rating.

As shown, the PFSADE 100 includes a side cover 110 and a housing 115. For example, the side cover 110 and the housing 115 may be made of metal. For example, the side cover 110 and the housing 115 may be made of stainless steel. For example, the housing 115 may be made of water resistant stainless steel. For example, the side cover 110 and the housing 115 may be made of plastic. For example, the side cover 110 and the housing 115 may be made of a combination of metal and plastic. In some examples, the housing 115 may be an electroplated nickel housing. For example, the side cover 110 may be an electroplated aluminum cover. Various other combinations of the above and other materials may be possible.

The housing 115, in this example, includes an opening 120 that allows electronics of the electronic device 105 to be installed within the housing 115. As shown, the housing 115 includes a mating perimeter opening 125. For example, after the electronics are installed, the side cover 110 may be coupled to the housing 115.

In this example, the side cover 110 includes a self-aligning element (SAE 130). In various embodiments, the SAE 130 may be one or more nubs. For example, the SAE 130 may protrude around a perimeter of the side cover 110. The SAE 130, for example, may interface with a press fit to the mating perimeter opening 125 of the housing 115. As shown, the SAE 130 may extend orthogonal to an edge surface 135 of the side cover 110. In some implementations, a size and distribution of the SAE 130 around the edge surface 135 may each advantageously provide a single point of contact around the mating perimeter opening 125. For example, the side cover 110 may be aligned within a predetermined position threshold relative to the housing 115 based on the size and distribution of the SAE 130.

In some implementations, the PFSADE 100 may advantageously facilitate installation of the side cover 110 to the housing 115. For example, in a cover installation assembly process, the SAE 130 may advantageously be self-aligned with the mating perimeter opening 125 to advantageously provide a friction fit at the mating perimeter opening 125. For example, the friction fit may maintain a relative position of the side cover 110 to the housing 115 against disturbance forces upon completion of the cover installation assembly process.

In some implementations, during a cover installation assembly process, the side cover 110 to the housing 115 may be required to be physically secured. For example, a positional relationship between side cover 110 to the housing 115 may be required to be maintained to withstand a predetermined minimum displacement force.

As an illustrative example shown in FIG. 1, the electronic device 105 may be, after being assembled in a factory 140, transported by a boat 145 to a destination (e.g., a warehouse at a destination country, a retail shop). In some implementations, the SAE 130 may be configured to be placed around the side cover 110 to advantageously result in a fit between side cover 110 to the housing 115 that may withstand displacement forces caused by transport (e.g., triggered by temperature or pressure variations during a sea freight), or manipulation of the electronic device 105, or any residual forces or reactions in an assembly process of the electronic device 105.

In some implementations, when the SAE 130 is engaged with the mating perimeter opening 125, the SAE 130 may be permanently deformed to be press-fitted to the mating perimeter opening 125. For example, the SAE 130 may advantageously require a minimum assemble force to be exerted to the SAE 130 to securely install the side cover 110 to the 115.

As an illustrative example, in an assembly process of the electronic device 105, dimensions of the opening 120 may vary (e.g., due to being produced in different manufacturing plants, different manufacturing machines, different environmental factors) for each of the housing 115. To secure the side cover 110 to the housing 115, for example, a smaller assembly force may be required for a larger opening 120 than a smaller opening 120. By configuring a size of the SAE 130, for example, the side cover 110 may be configured to require a maximum assembly force to be securely coupled to an identified smallest opening 120. For example, sizes and dimensions of the opening 120 may be statistically determined in an industrial design process. Accordingly, the SAE 130 may advantageously ensure reliability and consistency of the cover installation assembly process.

In various implementations, the PFSADE 100 may include the housing 115 coupled to the side cover 110. For example, the SAE 130 may extend orthogonally to the edge surface 135. For example, the SAE 130 may include a size and a distribution on the edge surface 135 configured to, upon securely coupled to the housing 115, withstand a predetermined assembly force threshold. For example, in an assembling process, the SAE 130 is permanently deformed by a pressing force larger than a predetermined assembly force threshold. For example, the side cover 110 is aligned within a predetermined position threshold relative to the housing 115 against subsequent displacement forces.

In this example, the PFSADE 100 includes a sealing cable connector 150. In some implementations, the sealing cable connector 150 may be sealingly coupled to the PFSADE 100 to prevent fluid communication between a cavity 160 of the PFSADE 100 and an ambient environment of the PFSADE 100. For example, the sealing cable connector 150 may ensure the PFSADE 100 to be water resistant. In some examples, during a transportation of the PFSADE 100, temperature and pressure variances may induce a higher pressure within the cavity 160 than the ambient environment of the PFSADE 100. The higher pressure may exert an upward force on the side cover 110. For example, the upward force may pop the side cover 110 to create a hole on an edge between the side cover 110 and the housing 115. In some examples, the upward force may break open the side cover 110.

In this example, the sealing cable connector 150 includes a pressure balancing channel (PBC 155). The PBC 155 may, for example, include a lumen connecting the cavity 160 to the external environment of the PFSADE 100. For example, when the PFSADE 100 is not coupled to other devices, the PBC 155 may relieve pressure build up within the cavity of the PFSADE 100. In some examples, when the sealing cable connector 150 is connected to a distant device via a closed electromagnetic conduit (e.g., a conduit 165 connecting the electronic device 105 to another device), the PBC 155 may be concealed so that the PFSADE 100 may advantageously maintain a water resistant rating in operation (e.g., in a connected state).

In various implementations, the PFSADE 100 may include a body defining the cavity 160 coupled to the sealing cable connector (e.g., the sealing cable connector 150) extending in a longitudinal axis configured to sealingly connect to a distant device via a closed electromagnetic conduit 165, wherein the cable connector includes a pressure balancing channel including a lumen extending from the cavity to a distal end of the cable connector. In some implementations, when the cable connector is disconnected, fluid pressure within the air-tight body is released through the pressure balancing channel. For example, when the cable connector is sealingly connected to the closed electromagnetic conduit, the cavity is limited to fluid communication with an interior of the closed electromagnetic conduit. Accordingly, for example, the cavity is fluidly separated from an exterior environment.

Figure 2A:
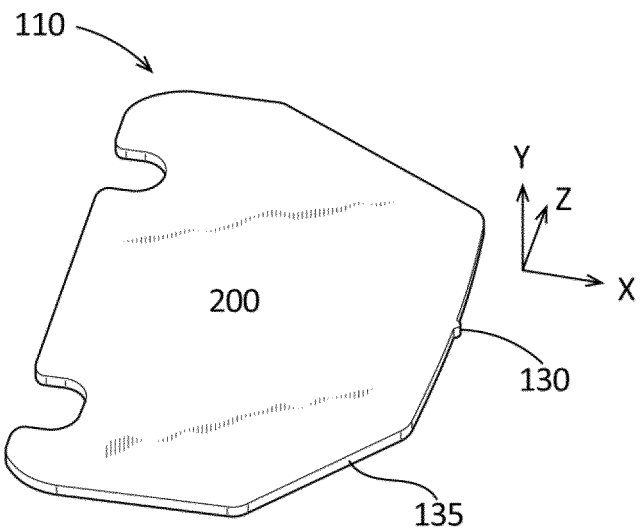
FIG. 2A, FIG. 2B, FIG. 2C, and FIG. 2D are schematic diagrams depicting an exemplary PFSADE and embodiments of pressed fit side covers of the PFSADE.

FIG. 2A, FIG. 2B, FIG. 2C, and FIG. 2D are schematic diagrams depicting exemplary PFSADEs and embodiments of pressed fit side covers of the PFSADEs. As shown in FIG. 2A, the side cover 110 includes the SAE 130 extending orthogonal to the edge surface 135. In this example, the side cover 110 includes a flat top surface 200. For example, the SAE 130 may extend substantially in the same plane of the flat top surface 200. In this example, the flat top surface 200 may be on an xz-plane (e.g., a horizontal plane) orthogonal to a y-axis, and the SAE 130 may be extending along an x-axis.

Figure 2B:
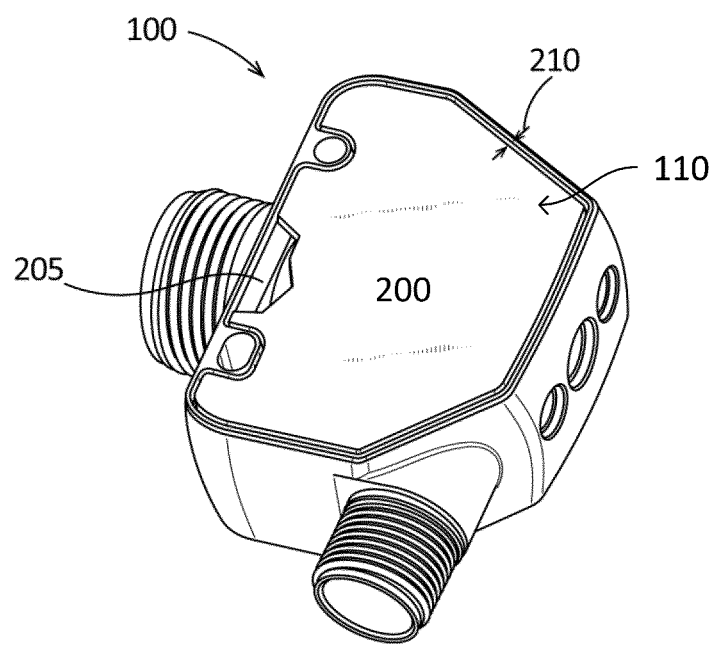

As shown in FIG. 2B, the side cover 110 is engaged and coupled to the housing 115. In some implementations, the housing 115 may be applied with a sealing member (e.g., an adhesive) on a ledge 205 before coupling to the side cover 110. For example, in an assembly process, a pressing force may be exerted on the flat top surface 200 against the ledge 205. For example, the sealing member may, for example, seal the housing 115 to the side cover 110 fluidly. As an illustrative example, in an assembly process, the sealing member may be applied to the ledge 205 before the housing 115 engages the side cover 110. For example, without the SAE 130 the side cover 110 may rattle around the opening without alignment.

In some implementations, the housing 115 may be metal injection molded. For example, the ledge 205 may become narrow at some spots around the opening 120. In this example, the PFSADE 100 may include a gap 210 between the side cover 110 and the housing 115. If the gap 210 is too large or excessively wide, for example, a void without a sealing member (e.g., adhesive) may be created at a narrow position of the ledge 205. For example, the void may create a leakage problem for the PFSADE 100.

If the gap 210 is too small, for example, the sealing member may be pressured to pop the side cover 110 up. For example, the popped up cover may create a distortion at the flat top surface 200. In some examples, the popped up cover may render the PFSADE 100 unsealed.

In some implementations, the SAE 130 may be self-fixing. For example, the side cover 110 may include a size and location of the SAE 130 determined based on measurements and/or experiments. In some examples, the size and location of the SAE 130 may advantageously reduce leaking of the PFSADE 100. For example, the width of the gap 210 throughout the PFSADE 100 may be controlled within a predetermined maximum width to minimize fault rate of the PFSADE 100. Accordingly, the SAE 130 may advantageously mitigate the leakage problem.

Figure 2C:
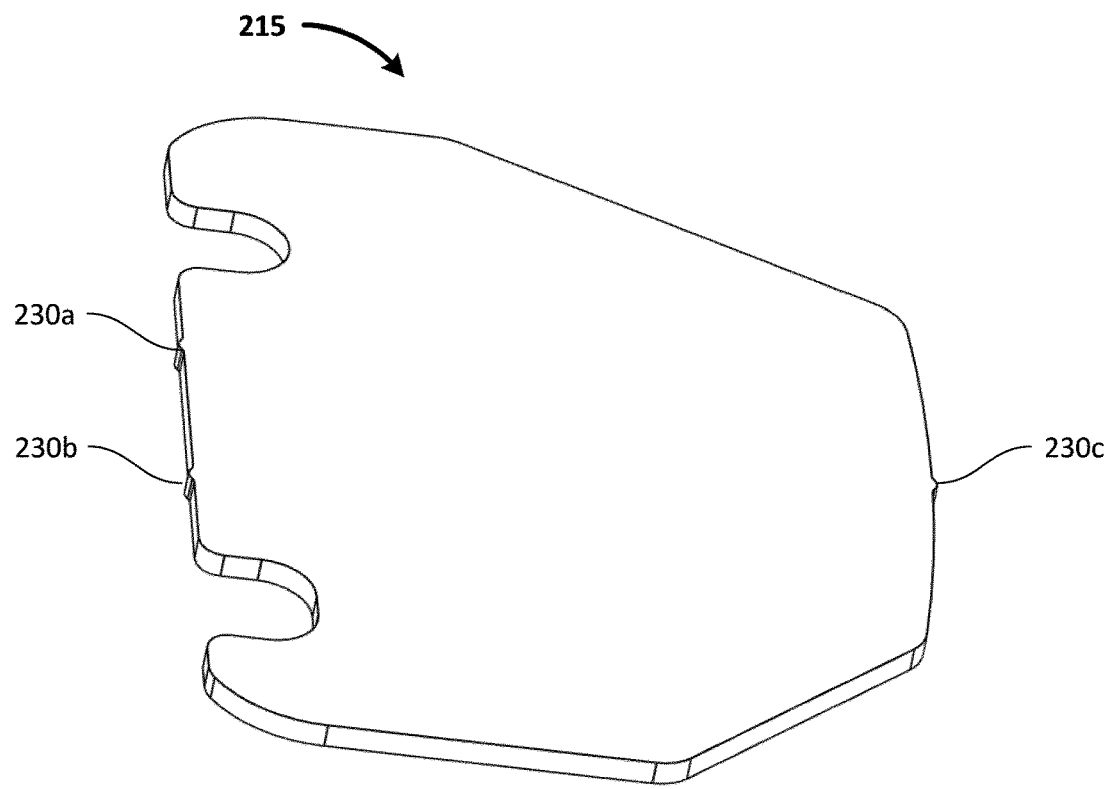
Figure 2D:
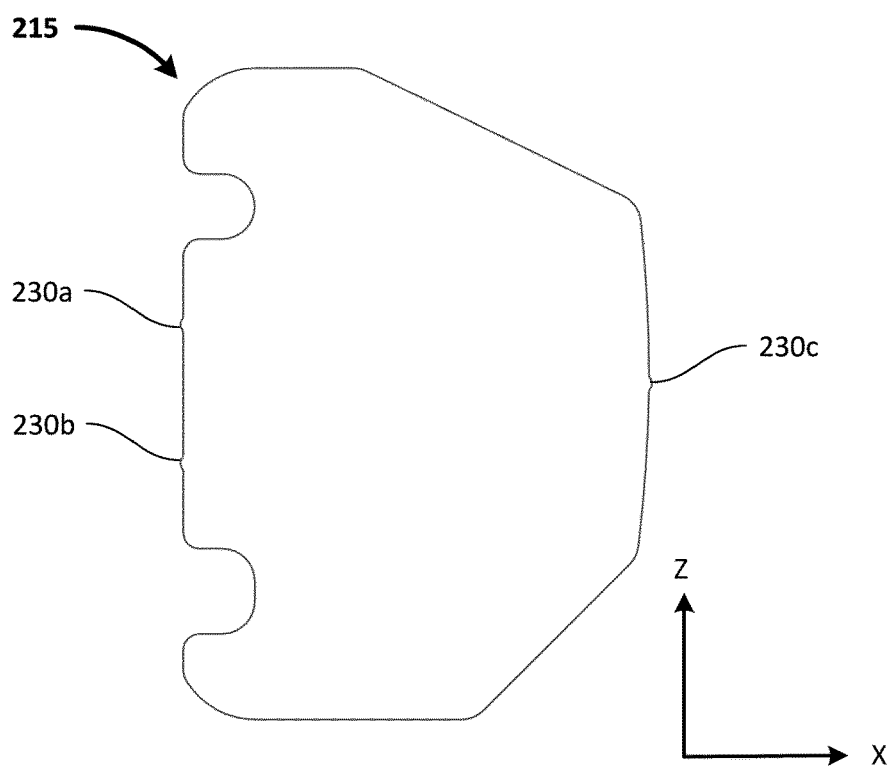

As shown in FIGS. 2C-2D, a side cover 215 includes nubs 230a, 230b, 230c. For example, the nubs 230a, 230b, 230c may be placed around an edge surface of the side cover 215 to advantageously self-center the side cover 215 on the xz-plane of an engaging opening (e.g., the opening 120).

In some implementations, additional SAEs (the nubs 230a, 230b, 230c) may advantageously distribute and/or balance an amount of force needed to install the side cover 215. For example, with one SAE (e.g., the SAE 130), a larger size of the SAE may be required to maintain a predetermined minimum installation force. For example, the nubs 230a, 230b, 230c may advantageously prevent wobbling of the side cover 215 after installation. For example, with spatially distributed SAEs, the PFSADE 100 may advantageously avoid a propensity to rotate, to translate, or a combination thereof.

In some implementations, the nubs 230a, 230b, 230c may be configured to be placed with a (e.g., statistically) most consistent reference ledge of the mating perimeter opening 125. For example, the most consistent reference ledge may be a statistically widest ledge. For example, the statistically widest ledge may statistically be receiving more adhesive to fixedly couple the side cover 215 to the housing 115. For example, the most consistent reference ledge may be determined by statistically observing size measurements (e.g., during manufacturing) of the housing 115. By configuring the nubs 230a-c to engage the most consistent reference ledge, a balanced force and relative position of the side cover 215 to the opening 120 may advantageously be controlled with a consistent contact with the ledge 205. Accordingly, for example, the PFSADE 100 may eliminate the need for the side cover 215 and the housing 115 to be perfectly fitted around the mating perimeter opening 125.

Figure 3A:
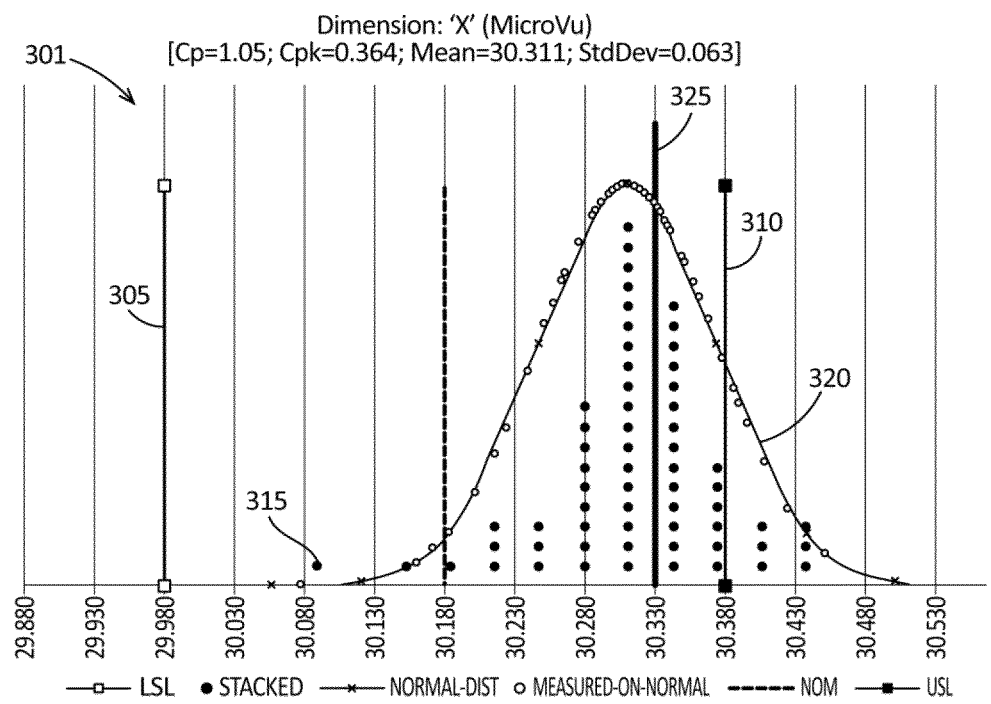
FIG. 3A and FIG. 3B show exemplary capability analysis of a manufacturing process of an exemplary PFSADE.
Figure 3B:
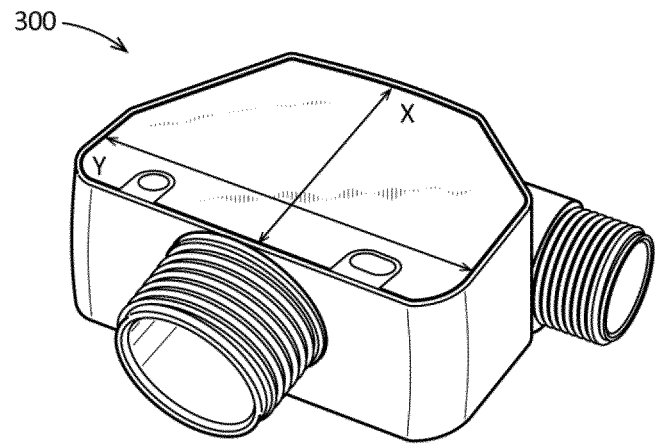

FIG. 3A and FIG. 3B show exemplary capability analysis of a manufacturing process of an exemplary PFSADE 300 (e.g., the PFSADE 100 as shown in FIG. 1). As shown in FIG. 3A, a graph 301 may display width measurements of a housing opening along a line x (as shown in FIG. 3B) of the PFSADE 300. In various implementations, based on the capability analysis shown in FIG. 3A, one or more SAEs may be configured in size and placement along an edge surface of a side cover (e.g., the edge surface 135). For example, the size and the placement may be configured to advantageously maintain a predetermined relative position to reduce unsealed products. For example, the size and the placement may be configured to advantageously withstand a range of predetermined force (e.g., an upward force to pop up the side cover) as a result of a typical assemble and/or transportation process.

As shown, the graph 301 includes a lower specification limit 305 and an upper specification limit 310. Measurements of the widths (x) are represented by dots 315 in the graph 301. A normal distribution 320 of the measurements are determined. Based on experimental data, in this example, a largest hole to self-center (as shown as a line 325) is identified. For example, the line 325 may be determined that any hole smaller than the line 325 may have no leakage problem.

In some implementations, a size of SAE may be limited by a maximum size (e.g., 1 mm in length, 1.5 mm in length). For example, an excessive sized SAE may create excessive materials during the assembly process. For example, the excessive material may damage the housing 115. In some implementations, a larger sized SAE may require a larger assembly force. For example, the maximum size of the SAE may be determined so that the assembly force to install a side cover may not damage an engaging housing.

In some implementations, a size of the SAE may be required to at least withstand a predetermined displacement force. For example, the size of the SAE may be configured to generate a frictional force to overcome 1.5 pounds of upward force.

Figure 4A:
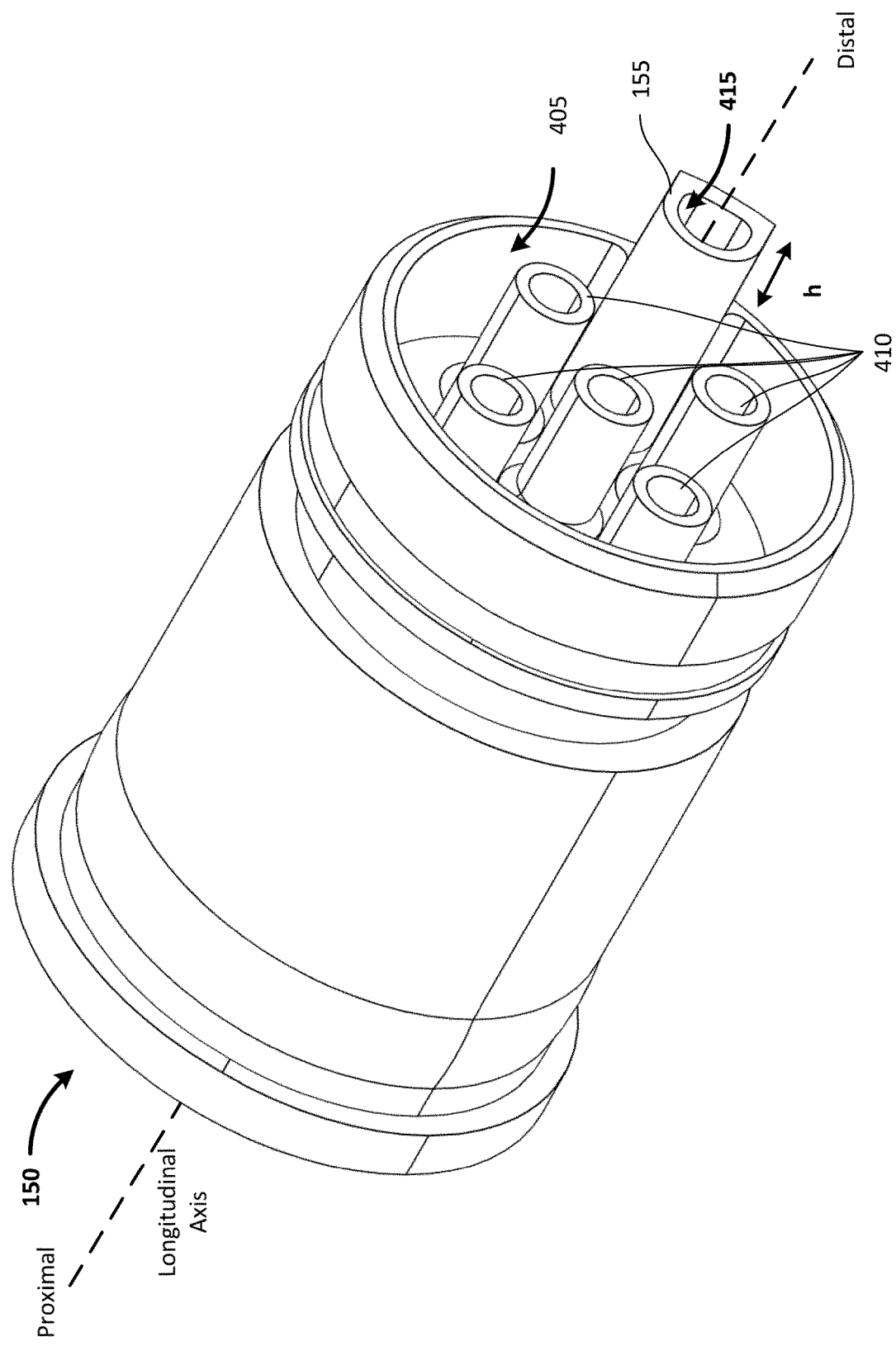
FIG. 4A and FIG. 4B depict an exemplary sealing cable connector of an exemplary PFSADE.
Figure 4B:
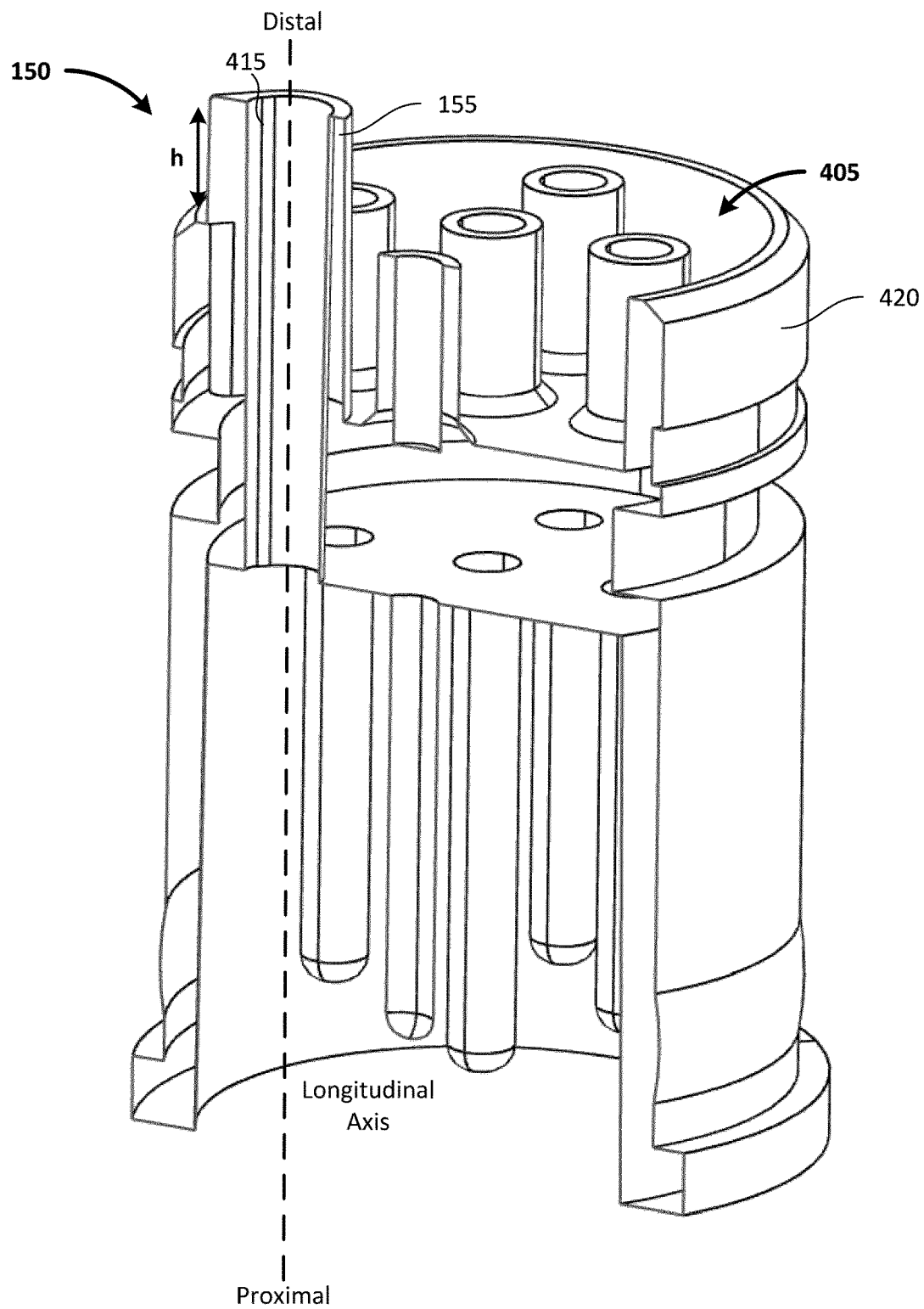

FIG. 4A and FIG. 4B depict an exemplary sealing cable connector 150 of an exemplary PFSADE. As shown in FIG. 1, the electronic device 105 may be operably coupled to a remote device via the sealing cable connector 150. In this example, as shown in FIG. 4A, the sealing cable connector 150 includes electric potting 405 and electrical prongs 410. For example, the electric potting 405 may be an epoxy configured to seal a joint between the electrical prongs 410 and a connecting surface of the sealing cable connector 150. For example, electrical wirings may be coupled to electronics disposed within the PFSADE 100 via the electrical prongs 410. For example, after the electrical wirings are coupled to the electronics in the PFSADE 100, the electric potting 405 may seal the cavity 160 of the PFSADE 100 from outside.

In this example, the sealing cable connector 150 includes the PBC 155 extending along a longitudinal axis. The PBC 155 includes a lumen 415. For example, the lumen 415 may extend from the cavity 160 of the housing 115 (as shown in FIG. 1) at a distal end of the sealing cable connector 150 to an exterior of the PFSADE 100 at a proximal end of the sealing cable connector 150.

The PBC 155, as shown in this example, extends longer than the electrical prongs 410 by a height h. For example, the height may advantageously avoid accidental filling of the electric potting 405 into the PBC 155.

In some implementations, the PBC 155 may relieve pressure differential between an external pressure and an internal pressure of the cavity 160 in a disconnected state, for example, when the PFSADE 100 is disconnected from the remote device (e.g., during transportation/storage). In operation, the PBC 155 is covered by a mating cover of a remote connector of a sealing conduit connecting to the remote device, for example. Accordingly, for example, the PFSADE 100 may advantageously remain water resistant (e.g., IP65, IP67, IP69k) during operation while reducing pressure differential between the cavity 160 and an external environment in the disconnected state.

As shown, the PBC 155 includes a D-shape cross-section. For example, the D-shape cross-section may advantageously increase air volume passing through the PBC 155. In some implementations, other cross-section shapes of the PBC 155 may also be used. For example, the PBC 155 may be implemented with a round cross-section. For example, may be implemented with a square cross-section. Various shapes of the PBC 155 may advantageously be easier to be manufactured based on, for example, manufacturing capability and pre-existing equipment. In some examples, some shapes of the PBC 155 may advantageously be more durable.

FIG. 4B shows a cross-section view of the PBC 155. In this example, the lumen 415 extends along the longitudinal axis to provide a fluidly communication channel between the proximal end of the PBC 155 to the distal end of the PBC 155. The sealing cable connector 150 includes a side wall 420 at a peripheral of the distal end. The side wall 420, for example, may be higher than the electrical prongs 410. For example, the side wall 420 may be filled with the electric potting 405 to fluidly seal the electrical prongs 410 from the exterior of a PFSADE. In this example, the PBC 155 may be extending towards the distal end in the longitudinal axis longer than the side wall 420. In some implementations, the electric potting 405 may be filled at maximum to a height of the side wall 420. For example, the electric potting 405 may advantageously be prevented from obstructing the fluid communication of the lumen 415 by the height differential h between the side wall 420 and the PBC 155.

Figure 5:
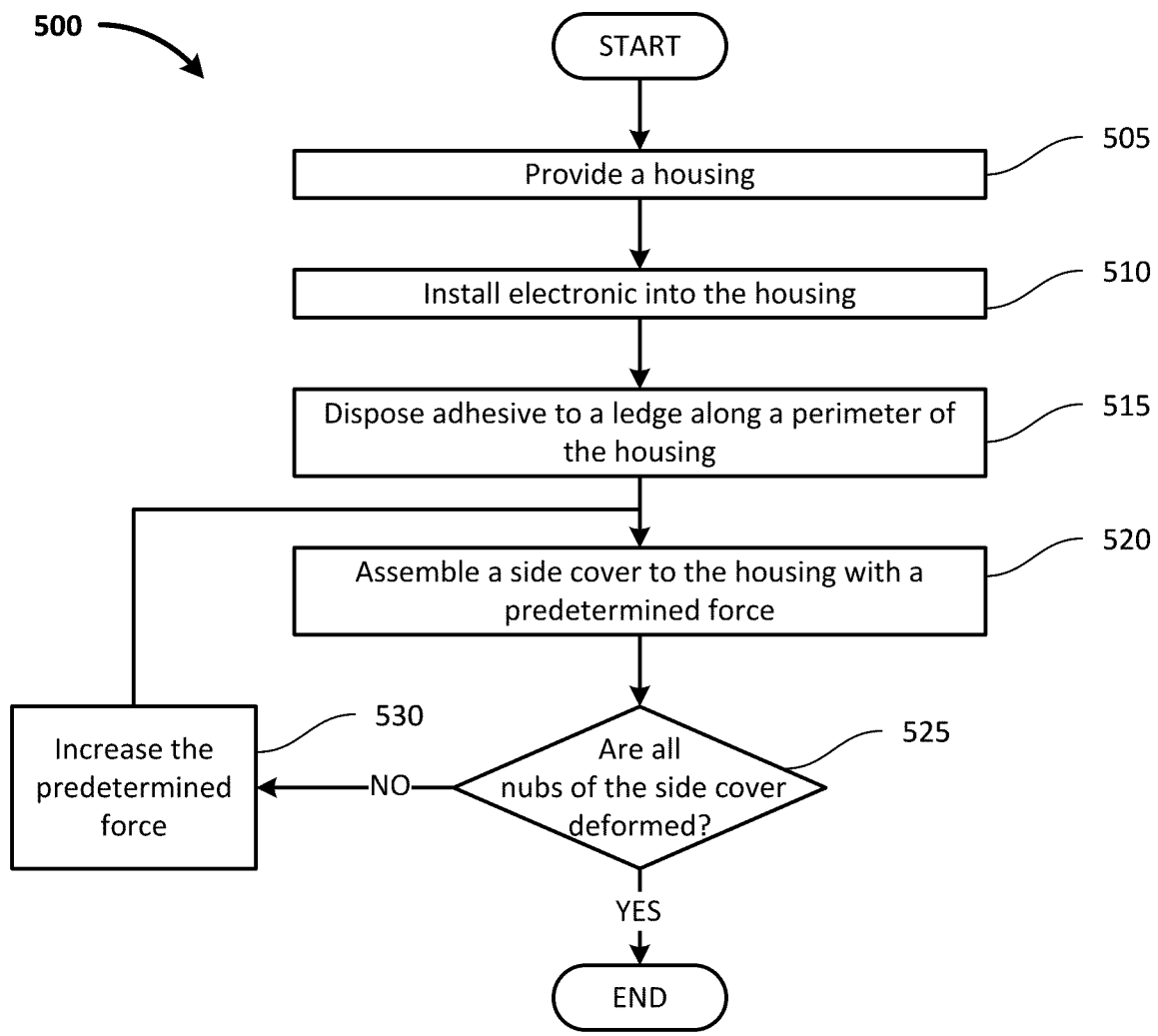
FIG. 5 is a flowchart illustrating an exemplary PFSADE assembly method.

FIG. 5 is a flowchart illustrating an exemplary PFSADE assembly method 500. For example, the method 500 may be used to assemble the side cover 110 to the housing 115 with reference to FIGS. 1-2D. In this example, the method 500 begins when a housing is provided in step 505. For example, the housing 115 is selected from a batch of metal molded housing from a manufacturing process. In step 510, electronic components are installed into the housing. Next, in step 515, adhesive is disposed on a ledge along a perimeter of the housing. For example, adhesive may be disposed along the ledge 205 of the mating perimeter opening 125.

In step 520, a side cover is assembled to the housing with a predetermined assembly force. For example, the predetermined assembly force may be applied by a motor actuator. In a decision point 525, it is determined whether all nubs of the side cover are deformed. For example, a sensor (e.g., optical sensor) may be used to determine whether the nubs 230a-c are deformed (e.g., with their tips sheared). If it is determined not all of the nubs are deformed, in step 530, the predetermined assembly force is increased, and the step 520 is repeated. If it is determined all of the nubs are deformed, the method 500 ends.

Figure 6:
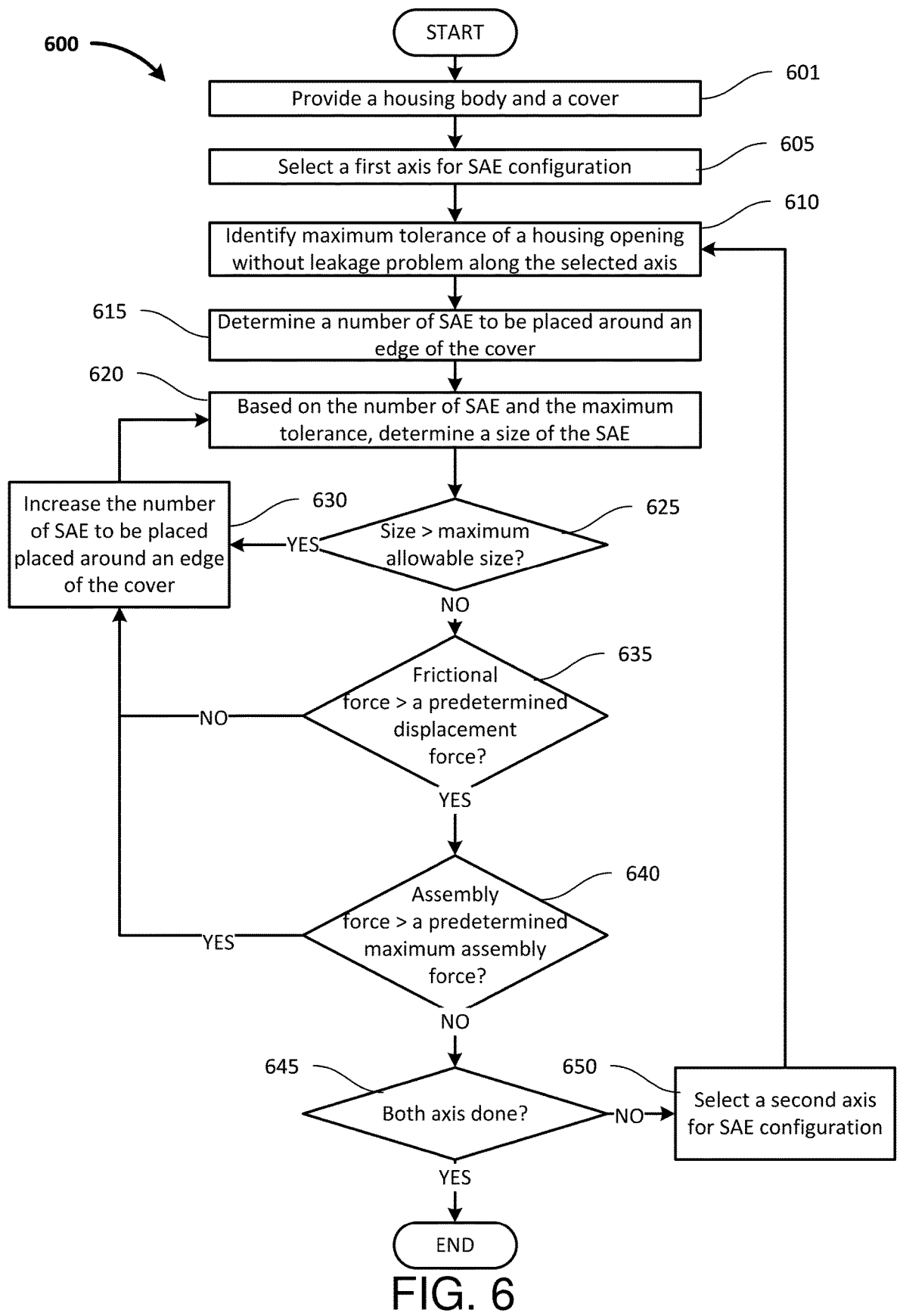
FIG. 6 is a flowchart illustrating an exemplary SAE configuration method.

FIG. 6 is a flowchart illustrating an exemplary SAE configuration method 600. For example, an industrial engineer may design placement and size of the nubs 230a-c on the side cover 215 based on the method 600. In this example, SAEs are considered to be placed on both axes of a PFSADE (e.g., the PFSADE 300). In other examples, SAEs may be required to be placed in one of the axes of the PFSADE to sufficiently maintain a self-alignment of a side cover (e.g., the side cover 110 in an opening (e.g., the opening 120) of a housing (e.g., the housing 115).

As shown, the method 600 begins in step 601 when a housing body (e.g., the housing 115) and a cover (e.g., the side cover 110) are provided. Next, in step 605, a first axis for SAE configuration is selected. For example, the dimension x (as shown in FIG. 3B) may be selected. In step 610, a maximum tolerance of a housing opening without a leakage problem is identified. For example, the maximum tolerance as shown in the line 325 is identified based on experimental data. For example the maximum tolerance may be identified based on simulation data. For example the maximum tolerance may be identified based on empirical calculations.

Next, in step 615, a number of SAE to be placed around an edge of the cover is determined. After the number of SAE is determined, a size of the SAE is determined based on the number of SAE and the maximum tolerance in step 620. For example, the size of the SAE may be determined to be aligning the side cover 110 to reduce the gap 210 to advantageously mitigate the leakage problem.

In a decision point 625, it is determined whether a size of the SAE is larger than a maximum allowable size. For example, the maximum allowable size may create excessive material that may damage the housing during the assembly process. If the size of the SAE is larger than a maximum allowable size, in step 630, the number of SAE to be placed around an edge of the cover is increased, and the step 620 is repeated. For example, a larger number of SAE may reduce the size required for the SAE. If the size of the SAE is smaller than a maximum allowable size, in a decision point 635, it is determined whether a frictional force is larger than a predetermined displacement force. For example, the frictional force may be a resulting friction after the side cover is coupled to the housing. For example, the predetermined displacement force may be an upward force determined to be withstood by the PFSADE.

If the frictional force is smaller than the predetermined displacement force, the step 630 is repeated. For example, a larger number of SAE may increase the frictional force at a contacting surface between the side cover and the housing. If the frictional force is larger than a predetermined displacement force, in a decision point 640, it is determined whether an assembly force is larger than a predetermined maximum assembly force threshold. For example, the predetermined maximum assembly force threshold may be determined based on a design and a material of the housing and the side cover. For example, when an assembly force required to install the side cover with the determined SAEs is larger than the predetermined maximum assembly force threshold, the side cover and/or the housing may be damaged in the assembly process.

If the assembly force is larger than the predetermined maximum assembly force, the step 630 is repeated. For example, a larger number of SAE may reduce a size required for the SAE to reduce the assembly force required for installing the side cover to the housing. If the assembly force is smaller than the predetermined maximum assembly force, in a decision point 645, it is determined whether configuration for both axes of the housing are completed. If configuration for both axes of the housing are not completed, in step 650 a second axis for SAE configuration is selected, and the step 610 is repeated. For example, after configuration of SAE at an x-axis of the PFSADE 300 is completed, configuration of SAT at a y-axis of the PFSADE 300 is selected. If configuration for both axes of the housing are completed, the method 600 ends.

Although various embodiments have been described with reference to the figures, other embodiments are possible. In some implementations, coupling of the side cover 110 to the housing 115 may include a laser welding process. For example, the side cover 110 may first be coupled to the housing 115. Then, for example, a laser weld may be applied to an engagement surface between the side cover 110 and the housing 115. For example, when a gap (e.g., the gap 210) is wider than a predetermined width, excessive power may be required to generate heat energy required to create a bigger weld to cover the gap. In some examples, the SAE 130 may advantageously reduce the required power to weld the side cover to the housing. For example, the reduced required power may advantageously reduce a risk of component damage during the welding process.

Although an exemplary system has been described with reference to FIG. 1, other implementations may be deployed in other industrial, scientific, medical, commercial, and/or residential applications. For example, the electronic device 105 may include a temperature sensor. For example, the electronic device 105 may include a vibration sensor.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, an electronic device enclosure may include a housing. The electronic device enclosure may include an opening configured to receive electronic components through the opening. The housing may include a ledge disposed around a perimeter of the opening; The electronic device enclosure may include a cover configured to couple to the housing and cover the opening of the housing. For example, the cover may include a top surface extending on a horizontal plane. The cover may include an edge surface orthogonal to the top surface around a perimeter of the cover. The cover may include at least one self-aligning element extending orthogonal to the edge surface. For example, the at least one self-aligning element may include a size and a distribution along the edge surface configured to align the cover in a relative position to the housing, and to withstand a predetermined minimum displacement force threshold.

For example, in an assembling process, a sealing member configured to fluidly seal the housing to the cover may be disposed on the ledge, and the ledge may be configured to engage the cover with an assembly force orthogonal to the top surface applied on the cover. For example, the at least one self-aligning element may be permanently deformed by the assembly force. For example, the assembly force may be less than a predetermined maximum assembly force threshold, and the relative position may be within a predetermined maximum displacement threshold.

For example, the predetermined maximum displacement threshold may be determined based on experimental data to mitigate a leakage problem due to excessively wide gap between perimeter of the opening and the edge surface. For example, the cover may include at least one self-aligning element on each axis of the horizontal plane.

For example, the cover may include three self-aligning elements. For example, the at least one self-aligning element may include a length of less than 1.5 mm. For example, the predetermined minimum displacement force threshold may include 1.5 pounds.

For example, may include electronics of a water resistant photoelectric distance sensor. The electronic device enclosure may include a connecting module configured to sealingly connect the water resistant photoelectric distance sensor to a remote device. For example, the connecting module may include a pressure balancing channel configured to include a fluidly communication between a cavity in the housing and an ambient environment. For example, in a disconnected mode, a pressure differential between the cavity and the ambient environment may be relieved via the pressure balancing channel. For example, in a connected mode, the connecting module receives a sealing connector such that the water resistant photoelectric distance sensor may be maintained to maintain a water resistant rating.

In an illustrative aspect, an electronic device enclosure may include a housing comprising an opening configured to receive electronic components through the opening. The housing may include a cover (110) configured to couple to the housing and cover the opening of the housing. For example, the cover may include a top surface extending on a horizontal plane. The cover may include an edge surface orthogonal to the top surface around a perimeter of the cover. For example, the cover may include at least one self-aligning element extending orthogonal to the edge surface.

For example, the at least one self-aligning element may include a size and a distribution along the edge surface configured to align the cover in a relative position to the housing, and to withstand a predetermined minimum displacement force threshold. For example, in an assembling process, the at least one self-aligning element may be permanently deformed by an assembly force less than a predetermined maximum assembly force threshold, and the relative position may be within a predetermined maximum displacement threshold.

For example, the housing may include a ledge disposed around a perimeter of the opening. For example, the ledge may be configured to engage the cover when the assembly force may be applied orthogonal to the top surface. For example, the electronic device enclosure may include a sealing member disposed on the ledge. For example, the sealing member may be configured to fluidly seal the housing to the cover.

For example, the predetermined maximum displacement threshold may be determined based on experimental data to mitigate a leakage problem due to excessively wide gap between perimeter of the opening and the edge surface. For example, the cover may include at least one self-aligning element on each axis of the horizontal plane. For example, the cover may include three self-aligning elements. For example, the at least one self-aligning element may include a length of less than 1.5 mm.

For example, the predetermined minimum displacement force threshold may include 1.5 pounds. For example, may include electronics of a water resistant photoelectric distance sensor. For example, the electronic device enclosure may include a connecting module configured to sealingly connect the water resistant photoelectric distance sensor to a remote device. For example, the connecting module may include a pressure balancing channel configured to include a fluidly communication between a cavity in the housing and an ambient environment.

For example, in a disconnected mode, a pressure differential between the cavity and the ambient environment may be relieved via the pressure balancing channel. For example, in a connected mode, the connecting module receives a sealing connector such that the water resistant photoelectric distance sensor may be maintained to maintain a water resistant rating.

In an illustrative aspect, an electronic device enclosure manufacturing method may include providing a housing body and a cover to be coupled to the housing body. The method may include identifying a tolerance measurement for self-alignment of the cover relative to the housing body (610). The method may include determining a number of at least one self-aligning element to be placed around an edge surface of the cover. The method may include determining a size of the at least one self-aligning element based on the tolerance measurement and the number of at least one self-aligning element.

For example, the size of the at least one self-aligning element may be less than a maximum allowable size. For example, a resulting frictional force between the housing body and the cover may be higher than a predetermined displacement force. For example, an assembly force required to couple the cover to the housing body may be less than a maximum assembly force (640). For example, a leakage problem of the electronic device enclosure may be mitigated.

For example, the method may include when the size of the at least one self-aligning element may be greater than the maximum allowable size, the resulting frictional force between the housing body and the cover may be higher than the predetermined displacement force, or the assembly force required to couple the cover to the housing body may be less than the maximum assembly force, increase the number of self-aligning elements to be placed around an edge of the cover.

In an illustrative aspect, an electronic device enclosure may include a housing may include an internal cavity that may include electronic components. The electronic device enclosure may include a cable connector coupled to the housing. For example, the cable connector extends in a longitudinal axis and may include at least one electrical conduit configured to sealingly connect the electronic component in the internal cavity to a distant device via a closed electromagnetic conduit. The cable connector may include an electric potting filling configured to fluidly seal the at least one electrical conduit from an exterior environment.

For example, a pressure balancing channel may include a lumen extending from the internal cavity to a proximal end of the cable connector. For example, in a disconnected mode, a fluid pressure within the internal cavity may be released through the pressure balancing channel. For example, in a connected mode, the at least one electrical conduit may be sealingly coupled to the closed electromagnetic conduit. For example, the internal cavity may be limited to fluid communication with an interior of the closed electromagnetic conduit such that the internal cavity may be fluidly separated from the exterior environment.

For example, the pressure balancing channel may include a non-circular cross-section. For example, the pressure balancing channel may include a D-shape cross-section. For example, the electric potting filling may include epoxy.

For example, the cable connector further may include a side wall at a peripheral of the proximal end of the cable connector along the longitudinal axis. For example, the pressure balancing channel extends longer than a height of the side wall along the longitudinal axis. For example, the electric potting filling may be prevented from obstructing the fluid communication of the lumen.

For example, in the connected mode, the electronic device enclosure may include at least an IP65 rating. For example, the housing may include stainless steel. For example, the housing may include electroplated aluminum.

In an illustrative aspect, an electronic device enclosure may include a housing may include an internal cavity. The internal cavity may include electronic components. The electronic device enclosure may include a cable connector coupled to the housing. For example, the cable connector extends in a longitudinal axis. The cable connector may include at least one electrical conduit configured to sealingly connect the electronic component in the internal cavity to a distant device via a closed electromagnetic conduit.

For example, a pressure balancing channel may include a lumen extending from the internal cavity to a proximal end of the cable connector. For example, in a disconnected mode, a fluid pressure within the internal cavity may be released through the pressure balancing channel. For example, in a connected mode, the at least one electrical conduit may be sealingly coupled to the closed electromagnetic conduit. For example, the internal cavity may be limited to fluid communication with an interior of the closed electromagnetic conduit such that the internal cavity may be fluidly separated from an exterior environment.

For example, the pressure balancing channel may include a non-circular cross-section. For example, the pressure balancing channel may include a D-shape cross-section. For example, the cable connector further may include an electric potting filling configured to fluidly seal the at least one electrical conduit from the exterior environment.

For example, the electric potting filling may include epoxy. For example, the cable connector further may include a side wall at a peripheral of the proximal end of the cable connector along the longitudinal axis. For example, the pressure balancing channel extends longer than a height of the side wall along the longitudinal axis. For example, the electric potting filling may be prevented from obstructing the fluid communication of the lumen.

For example, in the connected mode, the electronic device enclosure may include at least an IP65 rating. For example, the housing may include stainless steel. For example, the housing may include electroplated aluminum.

In an illustrative aspect, an electronic device enclosure may include a housing may include an internal cavity may include electronic components. The electronic device enclosure may include a cable connector coupled to the housing. For example, the cable connector extends in a longitudinal axis and may include means for sealingly connecting the electronic component in the internal cavity to a distant device. For example, a pressure balancing channel may include a lumen extending from the internal cavity to a proximal end of the cable connector.

For example, in a disconnected mode, a fluid pressure within the internal cavity may be released through the pressure balancing channel. For example, in a connected mode, the cable connector may be sealingly coupled to the distant device. For example, the internal cavity may be fluidly separated from an exterior environment. For example, the cable connector further may include an electric potting filling configured to fluidly seal the internal cavity from the exterior environment.

For example, the cable connector further may include a side wall at a peripheral of the proximal end of the cable connector along the longitudinal axis. For example, the pressure balancing channel extends longer than a height of the side wall along the longitudinal axis. For example, the electric potting filling may be prevented from obstructing a fluid communication of the lumen.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An electronic device enclosure comprising:
 a housing comprising:
  an opening configured to receive electronic components through the opening; and,
  a ledge disposed around a perimeter of the opening;
 a sealing member disposed on the ledge of the housing; and,
 a cover configured to couple to the housing and cover the opening of the housing, wherein the cover comprises:
  a top surface extending on a horizontal plane, wherein, when an assembly force is applied orthogonal to the top surface, the ledge is configured to engage the cover and the sealing member is configured to fluidly seal the housing to the cover;
  an edge surface orthogonal to the top surface around a perimeter of the cover; and,
  at least one self-aligning element, each comprising a protruding nub extending from and orthogonal to the edge surface, wherein the at least one self-aligning element comprises:
   in an open position, a size and a distribution along the edge surface configured to align the cover in a relative position to the housing; and,
   in a closed position, the at least one self-aligning element is permanently deformed by the assembly force, and the relative position between the cover and the housing is within a predetermined minimum and maximum displacement threshold.

2. The electronic device enclosure of claim 1, wherein the predetermined maximum displacement threshold is determined based on an upper width limit of a gap derived from experimental data to mitigate a leakage problem due to excessively wide gap between perimeter of the opening and the edge surface.

3. The electronic device enclosure of claim 1, wherein the at least one self-aligning element comprises a first self-aligning element and a second self-aligning element, wherein, the first and the second self-aligning elements each extends in orthogonal axes of the horizontal plane.

4. The electronic device enclosure of claim 1, wherein the cover comprises three self-aligning elements.

5. The electronic device enclosure of claim 1, wherein the at least one self-aligning element comprises a length of less than 1.5 mm.

6. The electronic device enclosure of claim 1, the predetermined minimum displacement force threshold comprises 1.5 pounds.

7. The electronic device enclosure of claim 1, further comprising electronics of a water resistant photoelectric distance sensor.

8. The electronic device enclosure of claim 7, further comprising a connecting module configured to sealingly connect the water resistant photoelectric distance sensor to a remote device, wherein the connecting module comprises a pressure balancing channel configured to comprise a fluidly communication between a cavity in the housing and an ambient environment such that,
in a disconnected mode, a pressure differential between the cavity and the ambient environment is relieved via the pressure balancing channel, and,
in a connected mode, the connecting module receives a sealing connector such that the water resistant photoelectric distance sensor is maintained to maintain a water resistant rating.

9. An electronic device enclosure comprising:
a housing comprising an opening configured to receive electronic components through the opening; and,
a cover configured to couple to the housing and cover the opening of the housing, wherein the cover comprises:
a top surface extending on a horizontal plane,
an edge surface orthogonal to the top surface around a perimeter of the cover, and,
at least one self-aligning element, each comprising a protruding nub extending from and orthogonal to the edge surface, wherein the at least one self-aligning element comprises:
in an open position, a size and a distribution along the edge surface configured to align the cover in a relative position to the housing; and
in a closed position, the at least one self-aligning element is permanently deformed by an assembly force, and the relative position between the cover and the housing is within a predetermined minimum and maximum displacement threshold.

10. The electronic device enclosure of claim 9, wherein the housing further comprises a ledge disposed around a perimeter of the opening, wherein the ledge is configured to engage the cover when the assembly force is applied orthogonal to the top surface.

11. The electronic device enclosure of claim 10, further comprising a sealing member disposed on the ledge, wherein the sealing member is configured to fluidly seal the housing to the cover.

12. The electronic device enclosure of claim 10, wherein the predetermined maximum displacement threshold is determined based on an upper width limit of a gap derived from experimental data to mitigate a leakage problem due to excessively wide gap between perimeter of the opening and the edge surface.

13. The electronic device enclosure of claim 9, wherein the at least one self-aligning element comprises a first self-aligning element and a second self-aligning element, wherein, the first and the second self-aligning elements each extends in orthogonal axes of the horizontal plane.

14. The electronic device enclosure of claim 9, wherein the cover comprises three self-aligning elements.

15. The electronic device enclosure of claim 9, wherein the at least one self-aligning element comprises a length of less than 1.5 mm.

16. The electronic device enclosure of claim 9, the predetermined minimum displacement force threshold comprises 1.5 pounds.

17. The electronic device enclosure of claim 9, further comprising electronics of a water resistant photoelectric distance sensor.

18. The electronic device enclosure of claim 17, further comprising a connecting module configured to sealingly connect the water resistant photoelectric distance sensor to a remote device, wherein the connecting module comprises a pressure balancing channel configured to comprise a fluidly communication between a cavity in the housing and an ambient environment such that,
in a disconnected mode, a pressure differential between the cavity and the ambient environment is relieved via the pressure balancing channel, and,
in a connected mode, the connecting module receives a sealing connector such that the water resistant photoelectric distance sensor is maintained to maintain a water resistant rating.

19. An electronic device enclosure manufacturing method, comprising:
provide a housing body and a cover to be coupled to the housing body;
identify a tolerance width measurement for self-alignment of the cover relative to the housing body;
determine a number of at least one self-aligning element to be placed around an edge surface of the cover;
determine a size of the at least one self-aligning element based on the tolerance width measurement and the number of at least one self-aligning element, such that:
the size of the at least one self-aligning element is less than a maximum allowable size,
a resulting frictional force between the housing body and the cover is higher than a predetermined displacement force, and,
an assembly force required to couple the cover to the housing body is less than a maximum assembly force, such that a leakage problem of the electronic device enclosure is mitigated.

20. The electronic device enclosure manufacturing method of claim 19, further comprising:
when the size of the at least one self-aligning element is greater than the maximum allowable size, the resulting frictional force between the housing body and the cover is higher than the predetermined displacement force, or the assembly force required to couple the cover to the housing body is less than the maximum assembly force, increase the number of self-aligning elements to be placed around an edge of the cover.

\* \* \* \* \*